Nov. 27, 1962   H. N. JAMES ET AL   3,066,000
BEARING MOUNTING
Filed Aug. 1, 1960
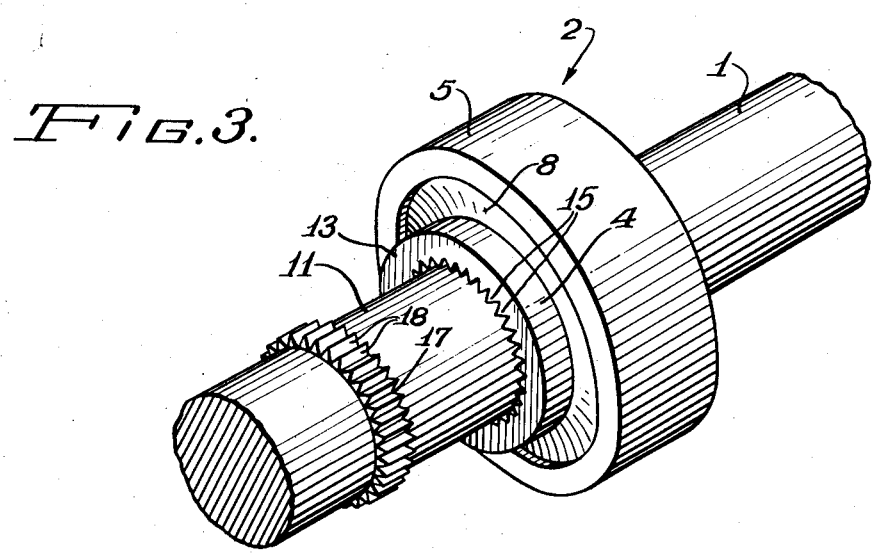
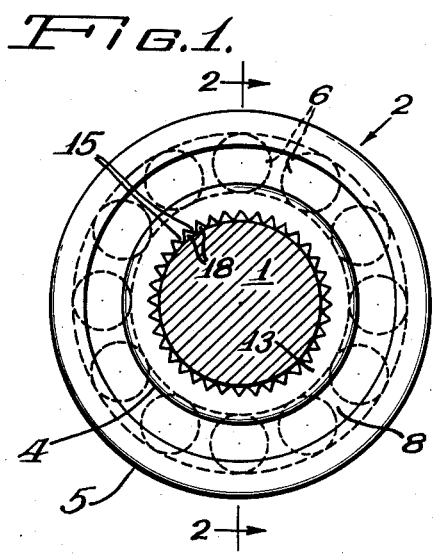
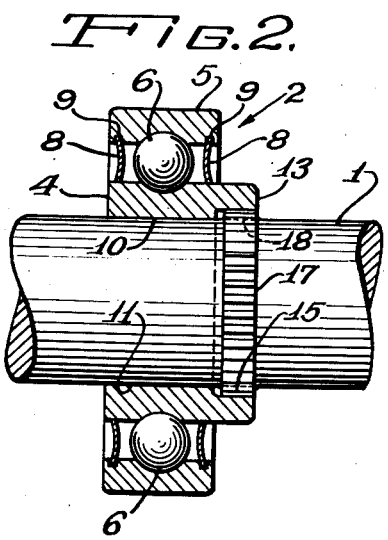
Inventors:
Howell N. James
Elof K. Karlsson
Atty.

3,066,000
BEARING MOUNTING
Howell N. James, and Elof K. Karlsson, Moline, Ill., assignors to International Harvester Company, Chicago, Ill., a corporation of New Jersey
Filed Aug. 1, 1960, Ser. No. 46,727
1 Claim. (Cl. 308—236)

This invention pertains to bearing mountings.

It has been found in anti-friction bearings employing seals between the inner and outer races thereof that the inner races particularly very often do not turn unitarily with or at the same rates as their supporting shafts, for instance, but slip thereon. This slippage or relative turning between the dry metal surfaces of the shafts and inner races where such movement is not intended to occur produces scoring, grooving, and other serious wear resulting in looseness or sloppiness of fit. Such looseness destroys any necessary alignment, concentricity, fixed center distances, and parallel relations between the shafts and other parts engaged by the bearings or components connected to the same and permits pounding to occur between the shafts and bearings and the setting up of severe vibration which is transmitted to adjacent and other parts resulting in damage to the shafts, bearings, and other parts and malfunctioning of components requiring expensive repairs and replacement of parts and units.

It is therefore a primary object of the invention to prevent slippage or relative turning between bearing members and parts on which they are supported or mounted giving rise to wear between those members and parts, looseness, and the resultant difficulties above noted.

It is another primary object of the invention to provide for mounting bearing members so as to prevent slippage or relative turning between the same and parts on which they are mounted, such mounting permitting ready and simple separation and removal of the bearings from their mounting members without the need of special equipment or skill for dissembly of portions of equipment and machinery in the field for maintenance and repair.

Another important object is to provide for the mounting of bearing members in accordance with the above requirements, the structure to effect the mounting being inexpensively made and easily assemblable in the first instance to achieve the mounting, without the use of close manufacturing tolerances.

Another important object is to provide for the interlocking of bearing members with parts on which they are mounted so as to prevent relative turning therebetween.

Another important object is to provide for the interlocking of bearing members with parts on which they are mounted so as to prevent relative turning therebetween, the bearing members being relatively loosely assembled on the mounting parts without close manufacturing tolerances and quickly and easily removable therefrom for dissembly.

Another important object is to provide means for interlocking bearing members with parts on which they are mounted so as to prevent relative turning therebetween, the interlocking means being independent of means for establishing a firm, immovable support of the bearing members on their mounting parts to prevent damage due to looseness therebetween and for the establishment of necessary alignment, concentricity, or parallel relation previously noted, the interlocking means not interfering with the establishment and preservation of such support and any of said relations.

Other objects and features of the invention will appear from the following description, read with the accompanying drawing, in which:

FIGURE 1 is a front elevational view of a roller bearing mounted on a rotatable shaft in accordance with the present invention;

FIGURE 2 is a sectional view thereof taken on line 2—2 of FIGURE 1 and in the direction indicated; and FIGURE 3 is a perspective view of the same with the shaft shown axially moved out of interlocking engagement with the bearing.

Referring to the drawing in detail, the reference character 1 denotes a rotatable shaft, only a fragmentary portion being shown, and 2 generally designates a ball bearing mounted thereon in accordance with the present invention. More particularly, the bearing comprises an inner race 4 and an outer race 5 between which are positioned a plurality of ball-bearing elements 6 in accordance with the usual construction for this type of bearing. Inner and outer annular seals 8 are provided on each side of the ball-bearing elements 6, spanning the distance between the inner and outer races of the bearing. The construction of these seals may be of any suitable form for the retention of lubricant within the line of bearing elements 6 and to prevent the ingress of dirt and other foreign matter which would produce accelerated wear between the ball elements and the supporting races thereof. In the form shown the seals 8 are supported in annular grooves 9 in the outer race 5 and extend into wiping contact around the outer periphery of the inner race 4.

The inner face 4 has an inner cylindrical surface 10 for firmly and immovably supporting and positioning the bearing on the shaft 1 so as to avoid the existence of any looseness between the bearing and shaft and to establish and maintain any necessary alignment, concentricity, or parallel relation between the shaft and other structure. A cylindrical surface 10 of the inner race engages a cylindrical surface portion 11 of the shaft for this snug, firm positioning of the bearing on the shaft. The lower race 4 is also provided with an annular extension or collar portion 13 to one side or end thereof. This extension 13 is provided with a continuous series of small teeth or serrations 15 extending around the entire inner periphery thereof. The shaft member 1 also has an annular portion 17 immediately beyond or at one end of the smooth cylindrical portion 11 thereof which is provided with a continuous series of small teeth or serrations 18 extending around the entire outer periphery thereof, which serrations are adapted to fit between the serrations 15 of the bearing race 4 for interlocking relation therewith.

During mounting of the bearing 2 on the shaft 1, the former is placed on the shaft and axially moved therealong, as indicated in FIGURE 1, until the teeth or serrations 15 around the inside of the collar portion 13 of the lower race 4 of the bearing engage between and interlock with the teeth or serrations 18 of the annular portion 17 of the shaft 1. Such interengagement can easily be accomplished by no more than a light tap from a hammer or the like.

It is pointed out that the relatively loose engagement between the serrations or teeth 15 of the bearing race 4 and those of the shaft 1 does not disturb the firm, immovable positioning of the bearing achieved by the snugly engaging cylindrical surfaces 10 and 11 of the bearing race 4 and shaft 1 in the disclosed form, respectively, the function of the interengaged teeth being merely to prevent relative turning or slippage of the bearing race 4 on the shaft 1 especially during a high rate or speed of rotation of the latter. The bearing is also easily removable from the shaft even after a long period of time by merely tapping the bearing with a hammer in the reverse direction.

The bearing 2 may be employed, along with another similar bearing, for the support of shaft 1 or the shaft may be otherwise supported and the bearing 2 employed, together with another similar bearing, for carrying other structure on their outer races requiring alignment, concentricity, or a parallel relation with the axis of the shaft 1.

Although the bearing support member 1 has been depicted as a rotatable shaft, the same or other supporting means may be stationary, if desired, for the mounting of rotatable structure on the outer peripheral surface of the outer race 5 of the bearing 2. In this case the same positioning and interlocking to prevent relative movement between the bearing and inner mounting member is also necessary to establish and preserve a firm, immovable position of the bearing and to prevent disturbance of any alignment and other critical relation required.

Although the anti-slipping, interlocked engagement has been described and illustrated as existing between the inner race of a bearing and an inner supporting member such as shaft 1, such interlocking anti-slippage provision may also be employed between the outer race of the bearing and its mounting member or structure or between both races and their respective mounting members. The disclosed teeth or serrations in the race of the bearing member, as well as in the shaft, can be easily pressed out or otherwise formed and the entire mounting including the smooth cylindrical surfaces such as 10 and 11 of the bearing race 4 and the shaft 1 together with the serrations 15 and 18 do not require any close tolerances in manufacturing but merely the usual tolerances employed for bearings used on shafts, for instance, are necessary.

Although a ball bearing has been disclosed, it is obvious that the invention also applies to roller bearings and to other forms of bearings as well.

Although a particular structure has been disclosed, it is not desired to limit the invention to that structure. Accordingly the appended claim should be limited only by its terms construed in the broad overall light of the invention in its various aspects.

What is claimed is:

A bearing mounting arrangement for affixing the bearing on a shaft, comprising a shaft, an inner race member having an inner portion defining a bore dimensioned to provide tight mounting of said member on said shaft and an outer portion defining a raceway, an outer race member having an inner portion defining a raceway therein, antifriction means disposed for rotation in said raceways, an annular extension integral with said inner portion of the inner race member and projecting therefrom along the axis of said shaft and spaced from said shaft, said extension having a plurality of teeth on the inner surface thereof, and locking means on said shaft, said locking means defining a plurality of teeth dimensioned for meshing engagement with said teeth on the annular extension of the inner race member, thereby to restrain said inner race member against more than a slight angular displacement relative to said shaft.

References Cited in the file of this patent

UNITED STATES PATENTS

| | | |
|---|---|---|
| 1,157,666 | Bennett | Oct. 26, 1915 |
| 1,889,064 | Dunham | Nov. 29, 1932 |
| 1,943,998 | Adams | Jan. 16, 1934 |
| 2,789,812 | Ruegg et al. | Apr. 23, 1957 |